United States Patent [19]

Oxley

[11] Patent Number: 4,712,163

[45] Date of Patent: Dec. 8, 1987

[54] INDICATOR LAMPS

[76] Inventor: Robert F. Oxley, 89a Route de Florissant, 1206 Geneva, Switzerland

[21] Appl. No.: 297,319

[22] Filed: Aug. 28, 1981

[51] Int. Cl.[4] .............................................. G01D 11/28

[52] U.S. Cl. ...................................... 362/29; 362/307; 362/310; 362/800

[58] Field of Search .................. 362/23, 29, 307, 310, 362/800

[56] References Cited

U.S. PATENT DOCUMENTS

| | | | |
|---|---|---|---|
| 3,746,853 | 7/1973 | Kosman et al. | 362/800 X |
| 3,821,590 | 6/1974 | Kosman et al. | 362/800 X |
| 3,871,170 | 3/1975 | Bergey | 362/23 X |
| 4,118,924 | 10/1978 | Foellner | 362/23 X |
| 4,206,493 | 6/1980 | Towne et al. | 362/800 X |
| 4,228,490 | 10/1980 | Thillays | 362/800 X |
| 4,296,459 | 10/1981 | DeLuca | 362/800 X |
| 4,321,655 | 3/1982 | Bouvrande | 362/23 X |
| 4,329,625 | 5/1982 | Nishizawa et al. | 362/800 X |
| 4,364,107 | 12/1982 | Wieczorek et al. | 362/800 X |

*Primary Examiner*—Peter A. Nelson
*Attorney, Agent, or Firm*—Fred Philpitt

[57] ABSTRACT

The invention relates to indicator lamps and in particular to such lamps which are required to be clearly visible in high ambient light conditions.

In order to overcome the problem of light emitted by the lamp competing with the ambient light reflected from the lamp the invention provides an indicator lamp having a light source contained within a light source support in which substantially all of the surfaces of the light source support surrounding the light source are coated black, except for a portion of the surfaces through which emitted light from the light source passes outwardly to the viewer.

In a preferred embodiment the light source is an L.E.D.

5 Claims, 2 Drawing Figures

INDICATOR LAMPS

DESCRIPTION

Figure 1:
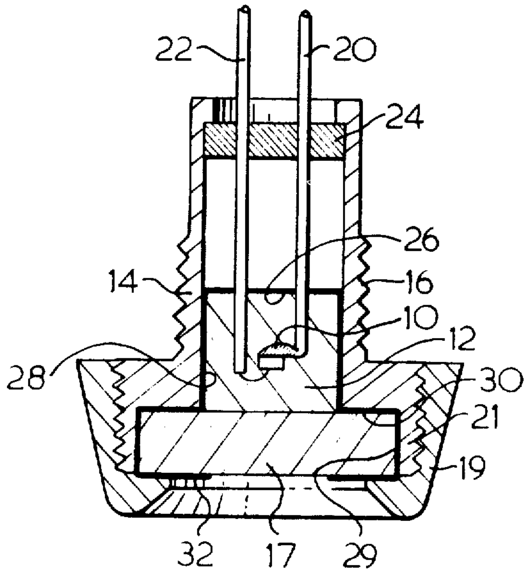

The present invention relates to indicator lamps and in particular to such lamps which are required to be clearly visible in high ambient light conditions, as for example in direct sunlight.

A basic problem in the design of indicator lamps is that the light emitted by the lamp competes with the ambient light reflected from the lamp. In conditions of high ambient illumination, the reflected light is comparable or even exceeds the emitted light so that it is extremely difficult to distinguish whether the lamp is on or off.

Furthermore, in lamps where coloured filters or lenses are used in conditions of high ambient illumination, the lamp can appear to be on when it is in fact off. This is clearly very undesirable.

Conventional means to increase the on/off contrast utilize filters, including circular polarizing, coloured, or neutral transmission filters, or various shading devices.

With a circular polarizing filter, ambient light enters the lamp and is circularly polarized by the filter. On reflection from any shiny surface, light within the polarized lamp effectively reverses its rotational properties so that on passing through the filter or lens after reflection the reflected light is extinguished. A disadvantage of this type of filter is, however, that the emitted light itself suffers at least 50% attenuation by the polarizing filter. In addition, the currently available polarizers are made of laminated plastics materials which cannot withstand the necessary environmental factors which are usually concommitant with high ambient lighting such as sunlight, e.g. U.V. can itself degrade the polarizing properties of the filter. Damp and high temperatures are also deleterious. Furthermore, circular polarizers do not attenuate non-specular reflections (i.e. reflections from non-shiny surfaces) because when this occurs the polarization of the light is destroyed by the diffuse nature of the reflection.

Coloured filters are particularly used for emitters such as light emitting diodes whose output is relatively monochromatic. A filter is chosen to match the output colour, the purpose of this filter being to ensure that reflected light from the lamp is at least the same colour as the emitted light. This increases the contrast between the lamp and its surrounding panel when the lamp is on - when it effectively appears brighter - but unfortunately under conditions of high ambient lighting the lamp will appear on when in fact it is off. Inevitably with coloured filters there is also a loss in light output due to transmission losses in the filter.

Neutral density filters (dark grey) can also be used to enhance visibility in conditions of high ambient lighting. Typically the filter is designed to attenuate say 90% of the transmitted light. Sunlight passes through the filter once and then reflects (either specularly or non-specularly from within the lamp) to pass through the filter a second time. The sunlight reflected from the lamp is therefore attenuated 10% and again 10%, i.e. 1% of the value when it entered the lamp. Compared to this, light emitted from the lamp is only attenuated to 10% of its original value, thus effectively increasing the on/off contrast ratio. However, the brightness of this lamp is clearly reduced significantly.

Other simple devices to shade ambient lighting include shrouds or Venetian blind type arrangements but these all suffer from the fact that they must of necessity reduce the viewing angle.

Other known lamps use antireflection coatings to prevent direct reflection from the front surface of the lens or filter but these work by arranging the refractive indices so that light can more easily pass through the filter. This, therefore, can effectively increase the amount of ambient light which enters and is therefore reflected from within the lamp.

It is an object of the present invention to improve on the aforementioned devices.

In accordance with the present invention, all or substantially all of the surfaces within or around the lamp are coated black except the area through which theneemitted light passes to the viewer.

Advantageously, in addition to the blacking of the interior surfaces, the viewing aperture is reduced in size by a non-reflective surface to match the size of the light beam from the emitter, thereby preventing unnecessary ambient light from entering the lamp.

The advantage of a lamp in accordance with the invention is that the reflection of ambient light from within the lamp is eliminated whilst ensuring that the emitted light is not substantially attenuated.

Particularly when using an LED, it is advantageous to coat with black the outside of the transparent package or lens which is generally provided as encapsulation for the diode itself, leaving a small aperture to allow the emitted light to pass. It is particularly important to blacken that part of the package behind the LED since this receives most of the ambient light.

Figure 2:
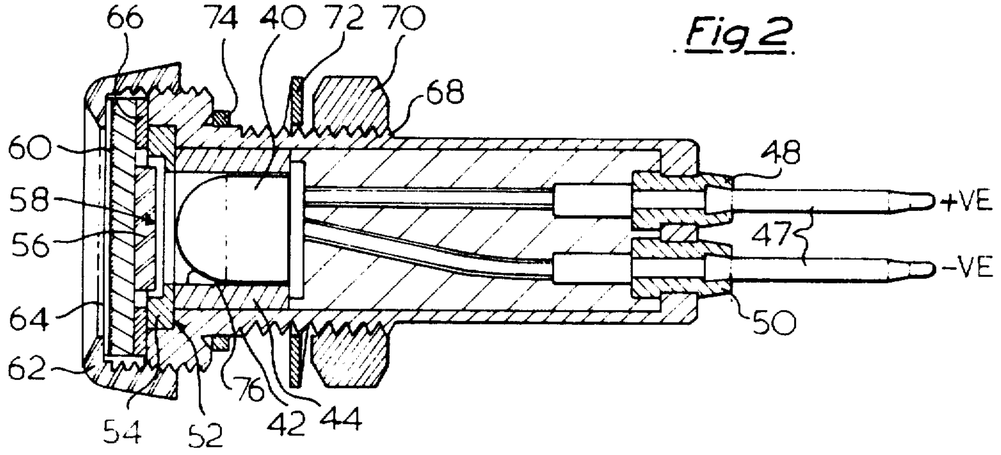

The invention is described further hereinafter, by way of example, with reference to the accompanying drawings, in which:

FIG. 1 is a diagrammatic longitudinal section through one embodient of an indicator lamp in accordance with the present invention; and FIG. 2 is a longitudinal section through a second embodiment.

The lamp illustrated in FIG. 1 includes an LED 10 enclosed in a transparent plastics encapsulation 12 which in this embodiment is cylindrical. The encapsulation LED is mounted in a cylindrical plastics or metal housing 14 which has an external screw-thread 16 to enable it to be panel mounted by means of a co-operating nut (not shown). The lamp also includes a glass lens 17 which has a diameter somewhat greater than that of the encapsulation 12. The LED and the glass lens 17 are held in place by an annular shroud 19 having an internal screw-thread which co-operates with a second screw-threaded portion 21 on the housing 14. The two terminations 20, 22 for the LED project rearwardly out of the encapsulation 12 and are supported at 24 where they leave the housing 14.

The most important feature of the illustrated lamp is that all of its interior surfaces are coated black, i.e. the circular rear surface 26 and cylindrical side surface 28 of the encapsulation 14, the cylindrical surface 29 of the lens 17 and also that annular portion of the lens 17 contacting the transverse surface 30 of the housing 14. In addition, in order to increase contrast in the embodiment illustrated, the viewing area is reduced to the diameter of the encapsulation 12 by means of an annular black coated rigion 32 on the front face of the lens.

Thus, in this embodiment a black-coated LED is optically coupled to a clear glass filter formed by the lens 17. The encapsulation 12 is arranged so that the diode itself is close to the viewing aperture. Glass is used to protect the plastics encapsulation in the embodiment from severe environments such as high intensity infra-red, or thermal blast as for example, produced by explosion. Such precautions are well known in the art. Other embodiments may not need such a lens at all.

In addition to the black non-reflection surfaces described above, the various filters mentioned earlier can also be used if, for example, it is impractical to blacken the emitter or its terminations or other parts of the lamp and where the disadvantages of filters can be tolerated, particularly as their efficiency need not be so high as when they are used alone.

In blackening the surface or surfaces, various treatments can be applied to the surface to increase the absorption of the light, for example the surface to be blackened can be physically roughened prior to blackening to increase the diffusion of light.

LEDs are particularly advantageous as the emitting area is relatively small so that most of the ambient light is absorbed by the black coated surroundings and not reflected directly by the diode itself.

However, whereas the invention has been described above in connection with a light emitting diode (LED) in the light source, it is equally applicable to other light sources such as incandescent filaments, gas discharge lamps, electroluminescent lamps etc.

In the particular case of a LED which is not mounted in a housing nor has a separate front lens, the conventional encapsulation of the diode itself would be blackened all over except for a small area on its front face to allow emitted light to pass.

The second embodiment illustrated in FIG. 2 comprises an LED 40 mounted within a cylindrical metal or plastics housing 42 by means of a centralising bush 44. The bush 44 would normally be made of a plastics material. Rearwardly extending, silicone rubber-covered lead wires of the LED are embedded in epoxy 46 and pass out of the rear of the housing to terminations 47 via respective insulating bushes 48,50. Disposed immediately in front of the LED 40 is a ring 52 of electrically conductive mesh which is held in place by means of an annular locking ring 54. Disposed in front of the conductive mesh 52 is a circular polariser disc 56 which can (optionally) have a neutral density filter 58 on one side surface. Disposed in front of the polariser 56 is a circular lens 60 which is held in place by means of an annular shroud 62. The lens 60 can have an anti-reflective coating 64 on its front face. Between the lens 60 and the housing 42 there can be a viton seal 66.

The housing 42 is externally screw-threaded at 68 and carries a lock-nut 70, crinkle-washer 72 and a sealing ring 74 to enable the housing to be panel mounted.

In accordance with the present invention, at least part of the internal cylindrical surface 76 of the centralising bush 44 is blackened. Other internal surfaces can be blackened, if necessary.

I claim:

1. In an indicator lamp having a LED light source embedded within a transparent plastics encapsulation, the improvement wherein substantially all of the surfaces of said transparent plastics encapsulation surrounding the LED are coated black except for a portion of said surfaces through which emitted light from the LED passes outwardly to the viewer.

2. An indicator lamp according to claim 1 further including a lens through which said encapsulated LED is to be viewed and a non-transparent housing which embraces the LED and the lens and supports the lens in its operative position with at least a portion of its rear surface lying against a front surface of the encapsulated LED, all surfaces of said encapsulated LED and said lens being coated black except for the surface areas of the LED encapsulation and lens in contact with one another and for the area of the front surface of said lens through which the emitted light from the LED is viewed.

3. An indicator lamp according to claim 1 wherein an outer annular portion of the front surface of the lens is provided with a non-reflective coating around the said area through which the emitted light from the LED is viewed.

4. An indicator lamp comprising a LED contained within a cylindrical transparent plastics encapsulation, said encapsulation having flat front and rear circular faces, a cylindrical lens, said lens having flat front and rear faces, a hollow cylindrical housing containing said encapsulated LED and lens and mounting said front surface of the encapsulation engagement with at least a portion of the rear surface of said lens, and an annular shroud which engages the housing and is adapted to hold the lens in position relative to the encapsulated LED, all of the external surfaces of the encapsulation and the lens being coated black except for the surface portions of the encapsulation and LED which contact each other and for the area of the front surface of the lens through which the emitted light from the LED is viewed.

5. An indicator lamp according to claim 4 wherein the diameter of the lens is greater than that of the encapsulation of the LED, the front surface of said lens being coated black except for a central circular area of diameter corresponding to that of said cylindrical encapsulation, through which the emitted light from the LED is viewed.

* * * * *

UNITED STATES PATENT AND TRADEMARK OFFICE

CERTIFICATE OF CORRECTION

PATENT NO. : 4,712,163

DATED : December 8, 1987

INVENTOR(S) : ROBERT P. OXLEY

It is certified that error appears in the above-identified patent and that said Letters Patent is hereby corrected as shown below:

On the title page insert:

-- FOREIGN APPLICATION PRIORITY DATA

August 30, 1980 United Kingdom 8028099 --.

Signed and Sealed this

Twenty-first Day of June, 1988

*Attest:*

DONALD J. QUIGG

*Attesting Officer*

*Commissioner of Patents and Trademarks*